(12) United States Patent
Ishiguro et al.

(10) Patent No.: US 12,050,455 B2
(45) Date of Patent: Jul. 30, 2024

(54) STATE PREDICTION APPARATUS AND SEMICONDUCTOR MANUFACTURING APPARATUS

(71) Applicant: HITACHI HIGH-TECH CORPORATION, Tokyo (JP)

(72) Inventors: Masaki Ishiguro, Tokyo (JP); Masahiro Sumiya, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/533,273

(22) Filed: Aug. 6, 2019

(65) Prior Publication Data
US 2020/0064820 A1 Feb. 27, 2020

(30) Foreign Application Priority Data
Aug. 21, 2018 (JP) .................................. 2018-154589

(51) Int. Cl.
*G05B 19/418* (2006.01)

(52) U.S. Cl.
CPC ............ *G05B 19/41885* (2013.01); *G05B 2219/45031* (2013.01)

(58) Field of Classification Search
CPC ............................................. G05B 19/41885
USPC ............................................................ 700/121
See application file for complete search history.

(56) References Cited

U.S. PATENT DOCUMENTS

| 6,658,423 B1* | 12/2003 | Pugh .................... G06F 16/355 |
| 2003/0045009 A1* | 3/2003 | Tanaka ................. G05B 23/024 |
| | | 257/E21.525 |
| 2003/0199108 A1* | 10/2003 | Tanaka ................. G05B 13/048 |
| | | 700/121 |

(Continued)

FOREIGN PATENT DOCUMENTS

| JP | 2007502026 A | 2/2007 |
| JP | 2007531922 A | 11/2007 |

(Continued)

OTHER PUBLICATIONS

T. Jolliffe, "Discarding Variables in a Principal Component Analysis I", Journal of the Royal Statistics Society Series C, vol. 21, No. 2, pp. 160-173, 1972.

(Continued)

*Primary Examiner* — Hien D Khuu
(74) *Attorney, Agent, or Firm* — Miles & Stockbridge, P.C.

(57) ABSTRACT

Provided is a state prediction apparatus that predicts a state of the plasma processing apparatus, a first set of features that indicates the state of the plasma processing apparatus is determined based on monitored data of the plasma processing apparatus in a normal state, a second set of features that indicates the state of the plasma processing apparatus is determined based on monitored data of the plasma processing apparatus, the features in the second set are calculated by using the features in the first set, a model that predicts the state of the plasma processing apparatus is generated by using a subset of the first set of features, which is composed of the same kind of features selected in descending order of the calculated features in the second set, and the state of the plasma processing apparatus is predicted by using the generated model.

9 Claims, 9 Drawing Sheets

(56) References Cited

U.S. PATENT DOCUMENTS

| | | | |
|---|---|---|---|
| 2004/0235304 A1* | 11/2004 | Oh | H01J 37/32935 |
| | | | 438/689 |
| 2004/0259276 A1 | 12/2004 | Yue et al. | |
| 2005/0004683 A1* | 1/2005 | Yamazaki | G05B 13/026 |
| | | | 700/30 |
| 2005/0006344 A1* | 1/2005 | Tanaka | H01L 21/67253 |
| | | | 216/59 |
| 2005/0010318 A1 | 1/2005 | Lev-Ami et al. | |
| 2005/0146709 A1* | 7/2005 | Oh | H01J 37/32935 |
| | | | 356/72 |
| 2005/0154482 A1* | 7/2005 | Tomoyasu | H01L 21/67069 |
| | | | 700/108 |
| 2007/0162172 A1* | 7/2007 | Tanaka | G05B 21/02 |
| | | | 700/108 |
| 2008/0125898 A1 | 5/2008 | Harvey et al. | |
| 2017/0256463 A1* | 9/2017 | Bailey, III | H01L 22/26 |
| 2019/0088455 A1* | 3/2019 | Kamaji | G06F 17/18 |
| 2020/0243359 A1* | 7/2020 | Hao | G05B 19/41875 |

FOREIGN PATENT DOCUMENTS

| | | | | |
|---|---|---|---|---|
| JP | 2010501091 A | | 1/2010 | |
| JP | 201883958 A | | 5/2018 | |
| JP | 2018083958 A | * | 5/2018 | |
| WO | 2004105101 A2 | | 12/2004 | |
| WO | WO-2021128510 A1 | * | 7/2021 | G01M 13/045 |

OTHER PUBLICATIONS

Office Action mailed Apr. 20, 2021 in Japanese Application No. 2018-154589.

\* cited by examiner

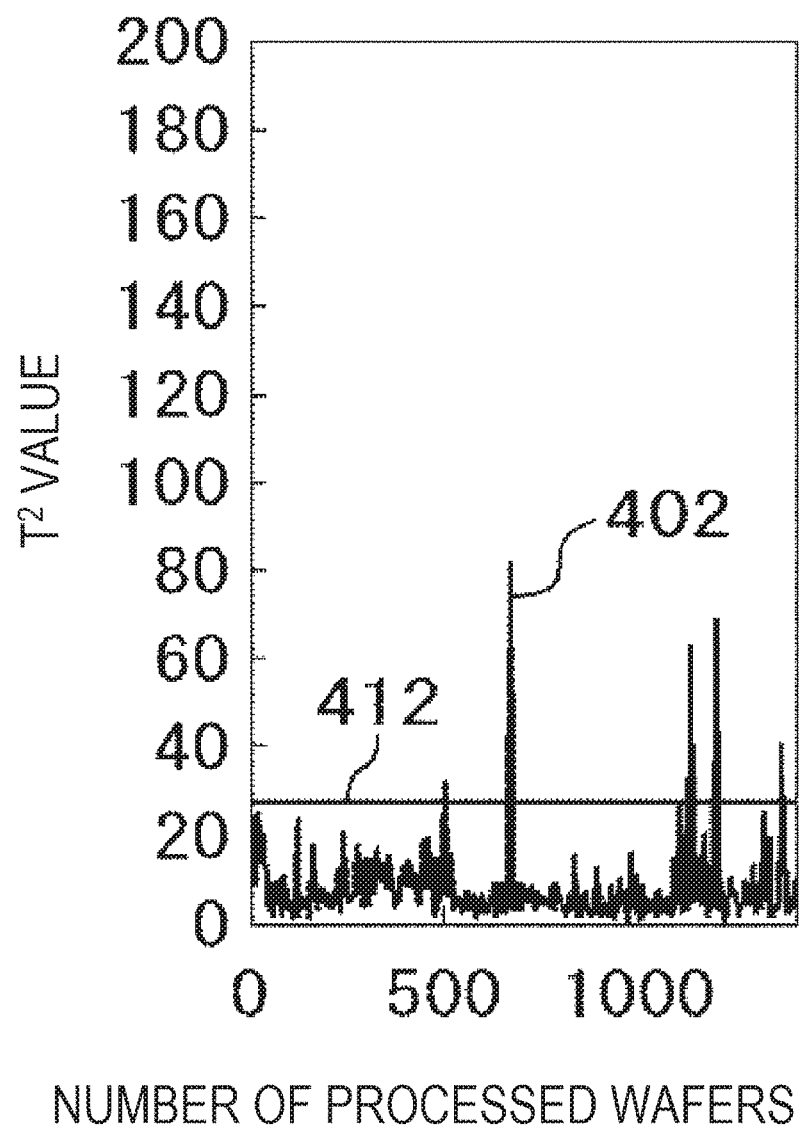

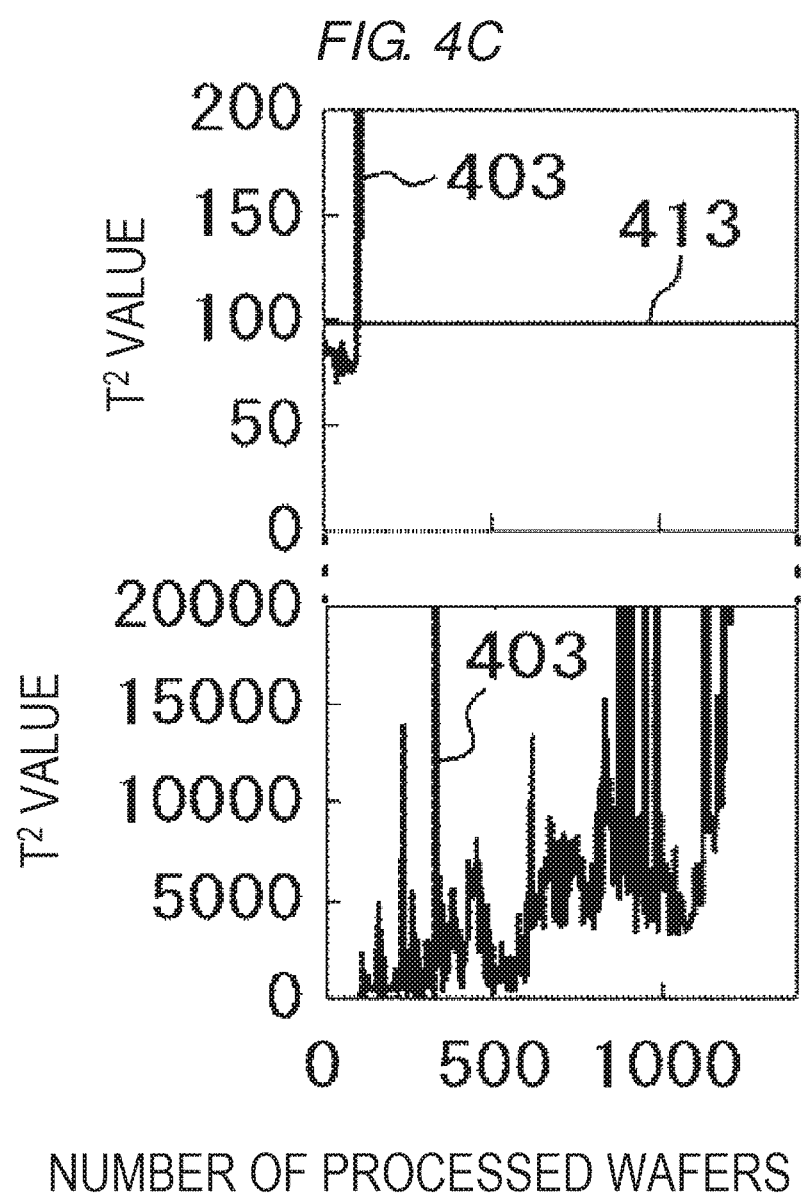

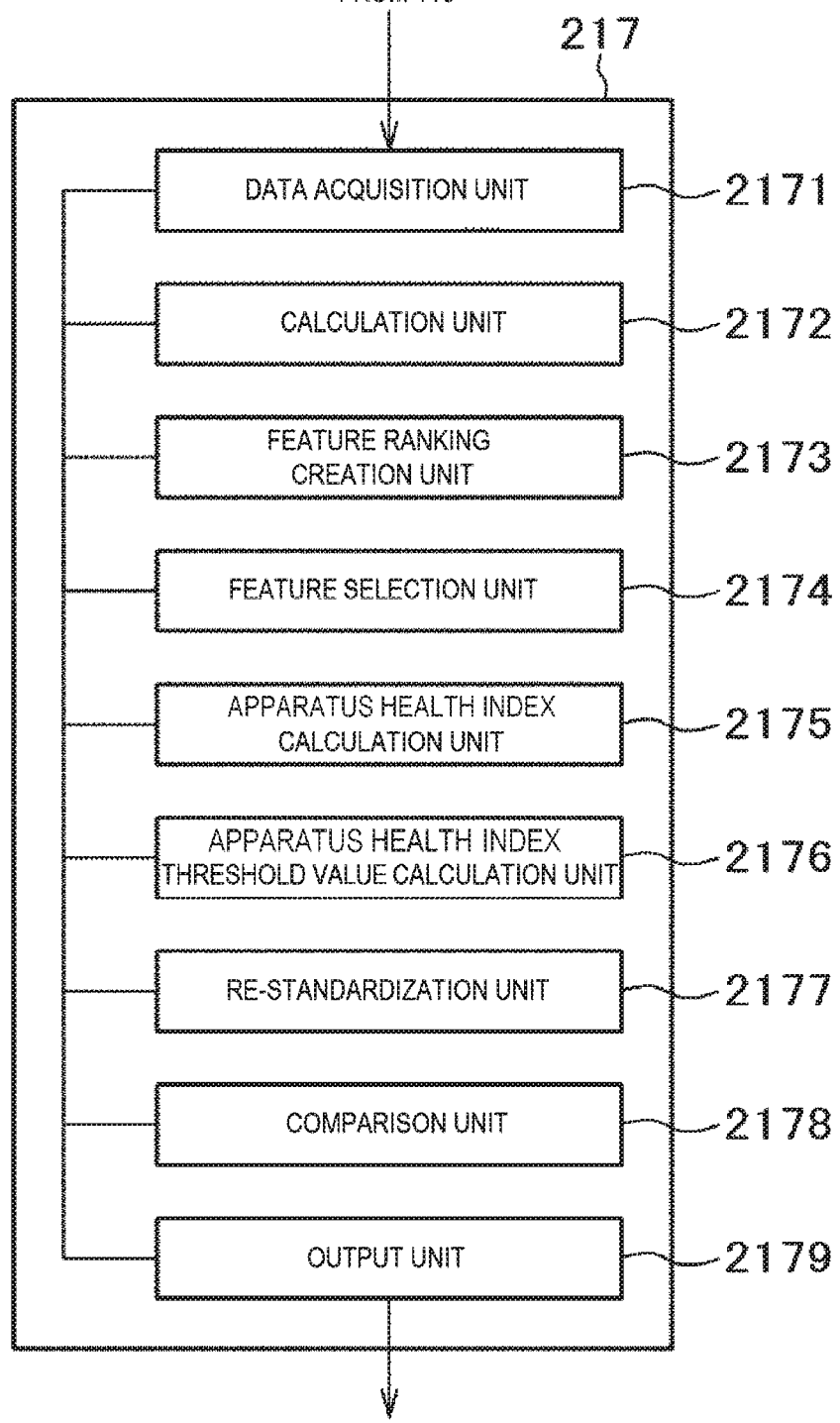

STATE PREDICTION APPARATUS AND SEMICONDUCTOR MANUFACTURING APPARATUS

BACKGROUND OF THE INVENTION

The present invention relates to a state prediction apparatus and a semiconductor manufacturing apparatus that uses the same, and particularly to a plasma processing apparatus having an abnormality detection function that uses the state prediction apparatus.

In recent manufacturing industry, efforts to improve productivity by effectively utilizing data obtained from a manufacturing apparatus are attracting attention.

For example, in a plasma processing apparatus that is a semiconductor manufacturing apparatus, it is common for one manufacturing apparatus to be equipped with tens of sensors for data acquisition. Data obtained from those sensors is used for early detection of an apparatus abnormality and the like and plays a part in improving productivity.

In normal data processing, a time-series signal obtained from measurement by a sensor is not used as it is, and a statistic or the like that well represents a feature of the signal is often used. An amount used to represent a feature of a signal is generally referred to as a feature.

For example, an average value, a standard deviation value, and the like of time-series signals are one of the features.

Although it is possible to compress a data amount to some extent by extracting features from a time-series signal, main information contained in the data may be lost when the extracted features are insufficient, and it is desirable to extract as many features as possible in a feature extraction stage.

Principal component analysis is often used as a method for extracting main information from a plurality of extracted features.

JP-T-2007-502026 (Patent Literature 1) discloses a processing system defect detection method that includes: obtaining data that has a plurality of data variables from the processing system for a plurality of observations; determining one or more principal components of the data for the plurality of observations by using principal component analysis; weighting at least one of the plurality of data variables during the principal component analysis; determining at least one statistic based on one or more scores calculated from projection of the additional data onto the one or more principal components; determining a control limit for the at least one statistic; and comparing the at least one statistic with the control limit.

Besides, there is a method of narrowing down the number of features to some extent before performing principal component analysis.

"Discarding Variables in a Principal Component Analysis I" (I. T. Jolliffe, "Discarding Variables in a Principal Component Analysis I," Journal of the Royal Statistics Society Series C, vol. 21, no. 2, pp. 160-173, 1972., Non-Patent Literature 1) discloses a method of narrowing down the number of features based on a value of a principal component load.

Although the principal component analysis as described in Patent Literature 1 is an effective method for extracting main information from a number of features, time required for calculation is long when the number of the features is large. In addition, when including a large amount of unnecessary features, those features act as noises in analysis, which may impair reliability of apparatus abnormality detection.

On one hand, it is effective to shorten calculation time by narrowing down features performing an analysis related to abnormality detection such as the principal component analysis as described in Non-Patent Literature 1. On the other hand, however, features that include main information for abnormality detection may be excluded. In the method of selecting features described in Non-Patent Literature 1, an analysis by the inventor has shown that elimination of some features may greatly impair reliability of abnormality detection.

In addition, as mentioned above, when the number of features is large, not only calculation time is long, but meaningless features serve as noises in abnormality detection, which may impair reliability of abnormality detection.

SUMMARY OF THE INVENTION

The invention solves problems in the related art described above, and an object thereof is to provide a state prediction apparatus having an abnormality detection function that enables highly reliable abnormality detection in short calculation time by reducing the number of features used for an analysis without excluding a main feature for abnormality detection of a plasma processing apparatus, and a plasma processing apparatus using the same.

In order to solve problems described above, the invention provides a state prediction apparatus that predicts a state of a plasma processing apparatus. In the state prediction apparatus, a first set of features that indicates the state of the plasma processing apparatus is determined based on monitored data of the plasma processing apparatus in a normal state, a second set of features that indicates the state of the plasma processing apparatus is determined based on monitored data of the plasma processing apparatus, the features in the second set are calculated by using the features in the first set, a model that predicts the state of the plasma processing apparatus is generated by using a subset of the first set of features, which is composed of the same kind of features selected in descending order of the calculated features in the second set, and the state of the plasma processing apparatus is predicted by using the generated model.

Further, the invention provides a semiconductor manufacturing apparatus that includes a processing chamber in which a sample is processed and a transfer chamber that transfers the sample to the processing chamber and is connected to the processing chamber. The semiconductor manufacturing apparatus further includes a control device, in which a first set of features that indicates a state of any provided configuration is determined based on monitored data in any provided configuration in a normal state, a second set of features that indicates any state is determined based on monitored data in any provided configuration, the features in the second set are calculated by using the features in the first set, a model that predicts the state of any provided configuration is generated by using a subset of the first set of the features, which is composed of the same kind of features selected in descending order of the calculated features in the second set, and the state of any provided configuration is predicted by using the generated model.

Further, the invention provides a semiconductor manufacturing apparatus that includes a processing chamber in which a sample is processed and a transfer chamber which transfers the sample to the processing chamber and is connected to the processing chamber. The semiconductor manufacturing apparatus further includes a state prediction apparatus, in which a first set of features that indicates a state of any provided configuration is determined based on monitored data in any provided configuration in a normal state, a second set of features that indicates any state is determined based on monitored data in any provided configuration, the features in the second set are calculated by using the features in the first set, a model that predicts the state of any provided configuration is generated by using a subset of the first set of features, which is composed of the same kind of features selected in descending order of the calculated features in the second set, and the state of any provided configuration is predicted by using the generated model.

According to a representative embodiment of the invention, it is possible to provide a state prediction apparatus having an abnormality detection function that enables highly reliable abnormality detection in short calculation time by reducing the number of features used for an analysis without excluding a main features for abnormality detection in a plasma processing apparatus.

BRIEF DESCRIPTION OF THE DRAWINGS

FIG. 4B is a graph showing a comparison example with the abnormality detection method that uses the abnormality detection unit according to the first embodiment of the invention, which shows a relationship between the number of processed wafers and the $T^2$ value when the $T^2$ value is calculated by using a method described in Non-Patent Literature 1.

FIG. 4C is a graph showing a result of abnormality detection that is performed by using the abnormality detection unit according to the first embodiment of the invention, which shows a relationship between the number of processed wafers and the $T^2$ value when the $T^2$ value is calculated by using a method described in the first embodiment of the invention.

FIG. 5 is a block diagram showing a configuration of an abnormality detection unit of a plasma processing apparatus according to a second embodiment of the invention.

DESCRIPTION OF EMBODIMENTS

Figure 1:
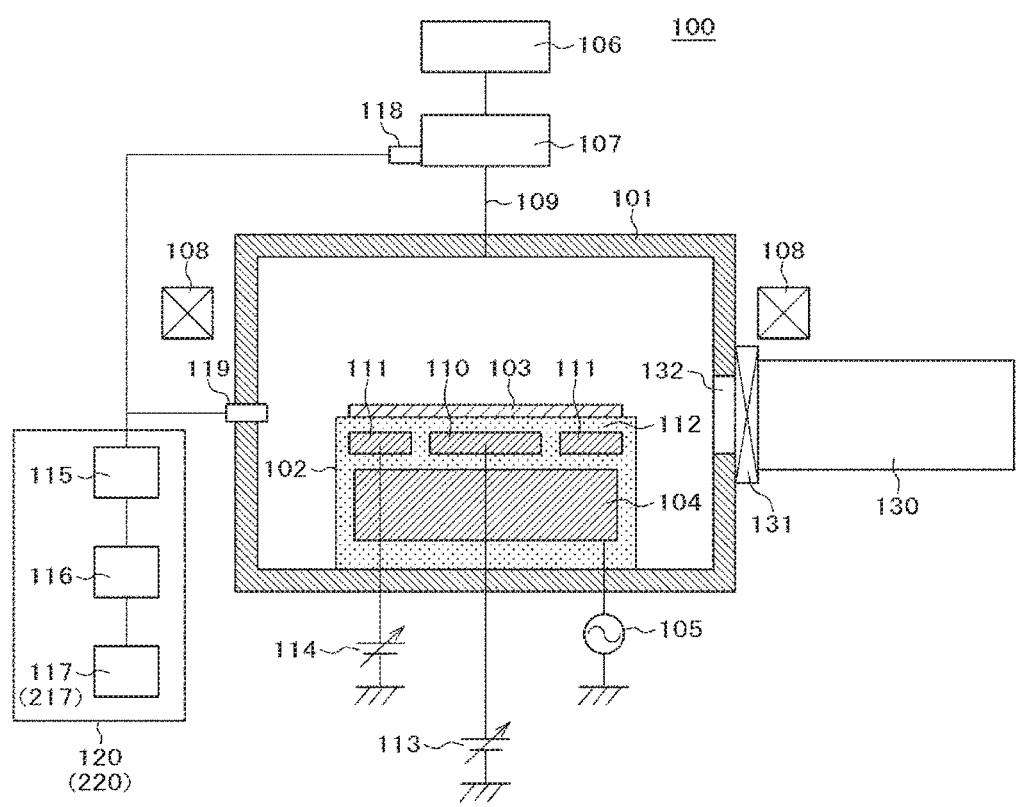
FIG. 1 is a cross-sectional view showing a cross-sectional configuration of main parts of a plasma processing apparatus according to a first embodiment of the invention.

The invention provides a plasma processing apparatus that generates plasma inside a processing chamber and processes a sample in the processing chamber. The plasma processing apparatus includes: a sensor that monitors an apparatus state of the plasma processing apparatus when processing the sample in the processing chamber; and an abnormality detection unit that detects an abnormality of the apparatus state by using time series data from the sensor that monitors the apparatus state of the plasma processing apparatus. The abnormality detection unit includes: a learning function unit that creates a model in which the plasma processing apparatus extracts features that indicate a normal apparatus state of the plasma processing apparatus based on the time series data from the sensor in the normal apparatus state and defines the normal apparatus state of the plasma processing apparatus by using the extracted features; and an abnormality detection function unit that extracts features that indicate a new apparatus state of the plasma processing apparatus based on a sensor signal newly acquired by the sensor and compares the features that indicate the new apparatus state with the model created by the learning function unit to detect an abnormality of the new apparatus state.

Hereinafter, embodiments of the invention will be described in detail with reference to drawings. In all the drawings used for explaining the embodiments, components that have the same functions are denoted by the same reference numerals, and a repetitive description thereof will be omitted in principle.

However, the invention should not be construed as being limited to the description of the embodiments described below. It will be readily understood by those skilled in the art that the specific configuration may be modified without departing from the spirit or scope of the invention.

First Embodiment

An analysis method according to a first embodiment of the invention will be described with reference to FIGS. 1 to 3. In the present embodiment, a case where an abnormality detection unit is applied to a plasma processing apparatus will be described.

FIG. 1 shows a cross-sectional configuration of main parts of a plasma processing apparatus 100 that includes the abnormality detection unit according to the first embodiment. FIG. 1 shows a case where an electron cyclotron resonance (ECR) etching apparatus is used as the plasma processing apparatus. Hereinafter, the electron cyclotron resonance is referred to as ECR.

In the plasma processing apparatus 100 that is the ECR etching apparatus in FIG. 1, a transfer chamber 130 is connected to a processing chamber 101 that is a vacuum processing chamber via a gate valve 131. When the gate valve 131 is opened, a wafer 103 that is a semiconductor substrate serving as a sample is carried from the transfer chamber 130 whose inside is evacuated into a vacuum by a vacuum evacuation unit (not shown) into the processing chamber 101 that is the vacuum processing chamber whose inside is evacuated into a vacuum by a vacuum evacuation unit (not shown) through an opening 132 by a transfer unit (not shown), and is mounted on a sampling stage 102 that is a sample mounting stage. When the gate valve 131 is closed after the wafer 103 is placed on the sample stage 102 and the transfer unit (not shown) is retracted into the transfer chamber 130, plasma is generated inside the processing chamber 101 as described below.

When the inside of the processing chamber 101 is adjusted to a desired pressure (a degree of vacuum) by introducing a processing gas into the processing chamber 101 by a gas supply unit (not shown) and evacuating the inside of the processing chamber 101 by an exhaust unit (not shown), the plasma processing apparatus 100 supplies electric power from a radio frequency power source 105 to a radio frequency electrode 104 that is installed inside the sample table 102 after plasma is generated inside the processing chamber 101 by using a mechanism that generates plasma described below.

Due to the supply of the electric power, a negative potential called a self-bias is generated on a surface of the wafer 103. So-called reactive ion etching occurs and etching processing is performed by drawing ions into the wafer 103 from the plasma by the negative potential.

The plasma processing apparatus 100 includes a microwave power source 106, a microwave oscillation source 107, and a solenoid coil 108 as a mechanism that generates plasma. A microwave that is generated at the microwave oscillation source 107 by radio frequency power from the microwave power source 106 is introduced into the processing chamber 101 via a waveguide 109.

The microwave that is introduced into the processing chamber 101 imparts energy to electrons by using ECR in a magnetic field generated by the solenoid coil 108. The electrons ionize gas supplied from a gas supply source (not shown) to generate plasma.

During plasma processing, a cooling gas for control of a temperature of the wafer 103 is supplied on a back surface of the wafer 103. In order to prevent displacement of the wafer 103 caused by the cooling gas that is supplied on the back surface, the wafer 103 is chucked on the sample stage 102 by an inner electrostatic chuck electrode 110 and an outer electrostatic chuck electrode 111.

The inner electrostatic chuck electrode 110 and the outer electrostatic chuck electrode 111 are concentrically disposed, the inner electrostatic chuck electrode 110 as one electrode being disposed on an inside, the outer electrostatic chuck electrode 111 as the other electrode being disposed on an outside. Independent variable DC power supplies 113 and 114 are connected to the inner electrostatic chuck electrode 110 and the outer electrostatic chuck electrode 111, respectively. The inner variable DC power supply 113 is connected to the inner electrostatic chuck electrode 110, and the outer variable DC power supply 114 is connected to the outer electrostatic chuck electrode 111.

As described above, the plasma processing apparatus 100 is equipped with various devices, power supplies, and the like. A number of sensors (not shown) for state handling are mounted inside or outside the devices, the power supplies, and the like. Signals from these sensors are stored in a data storage unit 115.

An example shown in FIG. 1 shows a configuration in which a signal from a voltage monitoring sensor 118 that is attached to the microwave oscillation source 107 and a signal from a pressure sensor 119 that detects internal pressure of the processing chamber 101 are stored in the data storage unit 115. Further, various features are extracted from time-series data obtained during processing by a feature extraction unit 116. The various features are sent to an abnormality detection unit 117 and used for a data analysis for abnormality detection.

The data storage unit 115, the feature extraction unit 116, and the abnormality detection unit 117 constitute an apparatus state abnormality detection unit 120.

Figure 2:
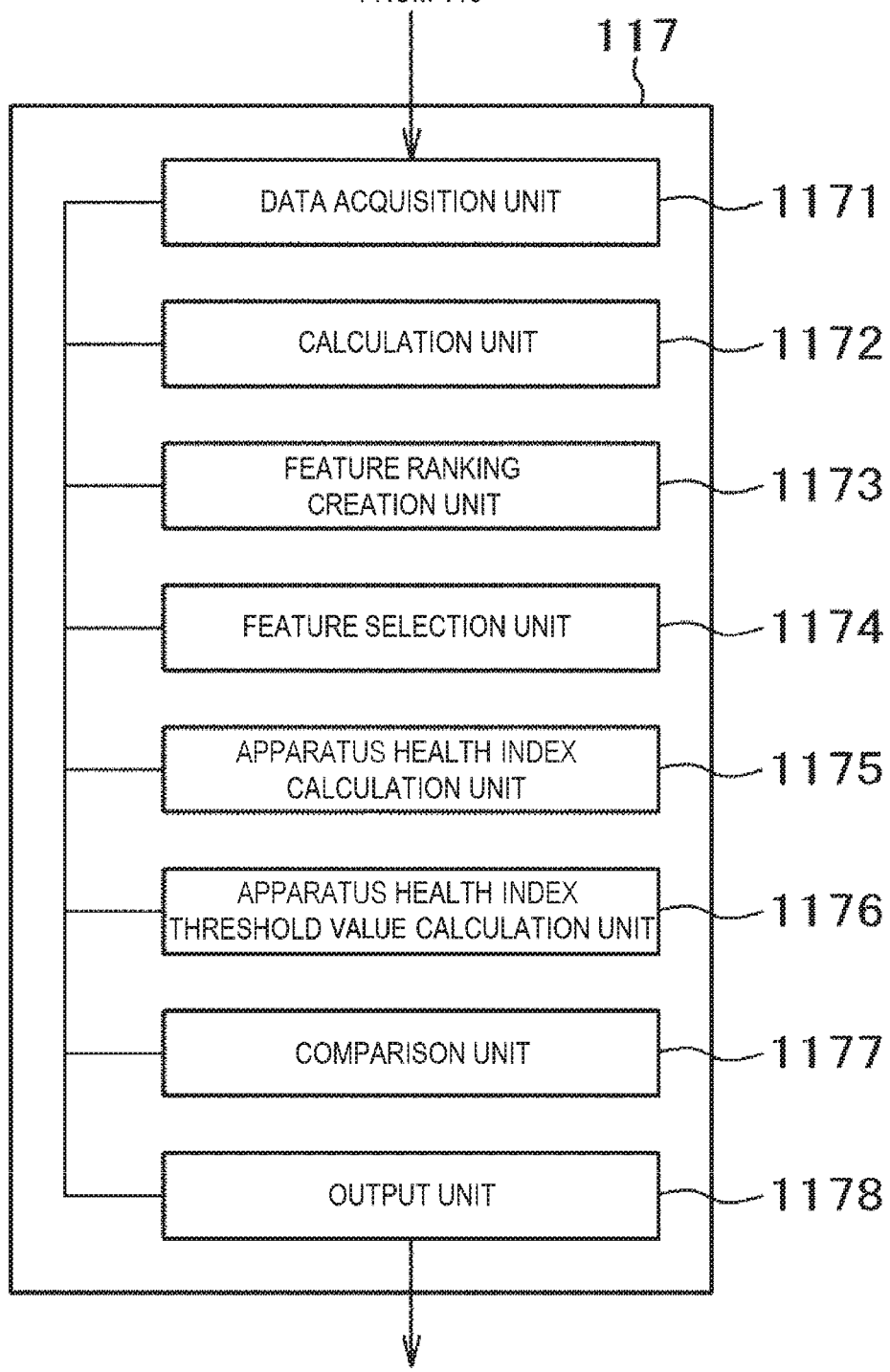
FIG. 2 is a block diagram showing a configuration of an abnormality detection unit of the plasma processing apparatus according to the first embodiment of the invention.

FIG. 2 is a block diagram showing a configuration of the abnormality detection unit 117 of the apparatus state abnormality detection unit 120 according to the present embodiment. The abnormality detection unit 117 according to the present embodiment includes a data acquisition unit 1171, a calculation unit 1172, a feature ranking creation unit 1173, a feature selection unit 1174, an apparatus health index calculation unit 1175, an apparatus health index threshold value calculation unit 1176, a comparison unit 1177, and an output unit 1178. Abnormality detection is performed by using information of the various features extracted by the feature extraction unit 116, and a result thereof is output to an outside from the output unit 1178.

Figure 3:
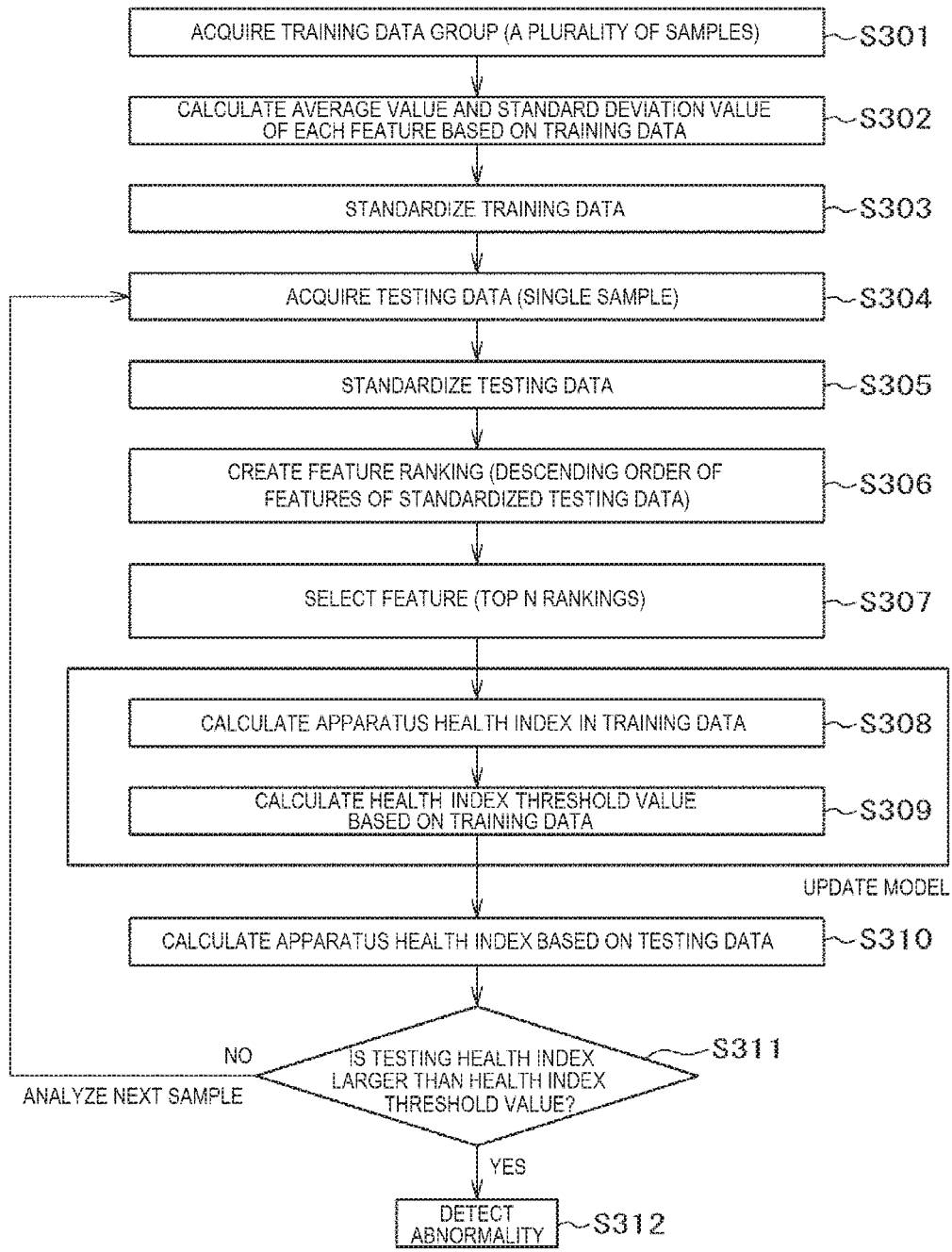
FIG. 3 is a flowchart showing a processing flow in abnormality detection in the plasma processing apparatus according to the first embodiment of the invention.

FIG. 3 is a flowchart of abnormality detection steps that is performed by the abnormality detection unit 117 in FIG. 2.

In a first step (S301) of abnormality detection, the data acquisition unit 1171 acquires a data group for a plurality of samples. The data group only includes data extracted by the feature extraction unit 116 in a normal etching apparatus state. The acquired data group of the plurality of samples is described as training data.

In a second step (S302) of abnormality detection, based on the training data acquired by the data acquisition unit 1171 in S301, the calculation unit 1172 calculates an average value and a standard deviation value of all samples of features in the normal apparatus state.

In a third step (S303) of abnormality detection, the calculation unit 1172 subtracts the average value of all the samples of the features in the training data calculated in S302 from a value of each feature of each sample in the training data acquired in S301 (subtraction processing). Further, the calculation unit 1172 divides a value obtained by the subtraction processing by the standard deviation value of all the samples of the features in the training data calculated in S302 (standardization processing).

Processing of the calculation unit 1172 in the third step (S303) is generally called standardization, and is expressed by the following equation.

$$V_{std} = \frac{V - M_{tr}}{S_{tr}} \qquad \text{(Equation 1)}$$

Here, $V_{std}$ is a value of a certain feature after standardization, V is a value of a certain feature before standardization, $M_{tr}$ is an average of all samples of a certain feature in the normal device state, and $S_{tr}$ is a standard deviation of all samples of a certain feature in the normal apparatus state.

In a fourth step (S304) of abnormality detection, the data acquisition unit 1171 acquires data of a certain processing for detecting an abnormality. The number of samples of the processing is 1 (a single sample). Data in the processing for detecting an abnormality is described as testing data.

In a fifth step (S305) of abnormality detection, the calculation unit 1172 performs standardization processing (testing data standardization) of the data of the processing for abnormality detection acquired by the data acquisition unit 1171. A method of standardization processing is the same as the method described in S303. That is, in Equation 1, $V_{std}$ is a value of the testing data after standardization, V is a value of the testing data before standardization, $M_{tr}$ is an average of all samples of a certain feature in the normal apparatus state determined in S302, and $S_{tr}$ is a standard deviation of all samples of a certain feature in the normal apparatus state determined in S302.

A meaning of a standardized value of testing data is shown below. The standardized value is an index that indicates a degree of deviation of the testing data from the normal apparatus state. Therefore, the feature deviates further from the normal state as the value becomes larger, and conversely, the feature can be considered to be in the normal state when the value is small. In abnormality detection, a feature in a state different from a normal state should be noted, and the standardized value can be used as an index for feature selection.

In a sixth step (S306) of abnormality detection, the feature ranking creation unit 1173 creates a ranking of features in descending order of standardized values obtained by the calculation unit 1172 in the fifth step (S305).

In a seventh step (S307) of abnormality detection, the feature selection unit 1174 selects a predetermined number of features in descending order of the ranking created by the feature ranking creation unit 1173 in the sixth step (S306). For example, when ten features are selected, features from a first rank to a tenth rank are selected.

In an eighth step (S308) of abnormality detection, the apparatus health index calculation unit 1175 extracts only a features selected by the feature selection unit 1174 in the seventh step (S307) from the data group in the normal apparatus state acquired by the data acquisition unit 1171, and creates a model for abnormality detection. In the present embodiment, a principal component analysis (PCA) and a Hotteling's $T^2$ value associated therewith are described as a method of creating the model for abnormality detection.

Hotteling's $T^2$ is a value serving as an index that indicates an abnormal state of an apparatus, and is expressed by the following equation.

$$T^2 = xP\Lambda^{-1}P^T x^T \qquad \text{((Equation 2)}$$

Here, $T^2$ is a vector that has m components which include a Hotteling's $T^2$ value of each sample. m is the number of samples. x is a selected m×n feature matrix in a normal state. n is the number of selected features. P is an n×o principal component load matrix. $\Lambda$ is an o×o diagonal matrix of eigenvalues in the principal component analysis. O is the number of selected principal components. The Hotteling's $T^2$ value will be described below as an apparatus health index of the plasma processing apparatus 100.

In a ninth step (S309) of abnormality detection, the device health index threshold value calculation unit 1176 determines an apparatus health index threshold value used for detecting an abnormality based on the apparatus health index determined by the apparatus health index calculation unit 1175 in the eighth step (S308).

In a tenth step (S310) of abnormality detection, the apparatus health index calculation unit 1175 calculates the apparatus health index of the testing data by using the feature selected from the testing data by the feature selection unit 1174 and the principal component model obtained by the apparatus health index calculation unit 1175 in the eighth step (S308).

In an eleventh step (S311) of abnormality detection, the apparatus health index (the testing health index) in the testing data calculated in the tenth step (S310) of abnormality detection by the apparatus health index calculation unit 1175 and the apparatus health index threshold value determined by the apparatus health index threshold value calculation unit 1176 in the ninth step (S309) are compared in the comparison unit 1177.

As a result of comparison in the comparison unit 1177, if the apparatus health index (the testing health index) in the testing data is larger than the threshold value obtained by the apparatus health index threshold value calculation unit 1176 in the ninth step (S309) (a case of YES in S311), the processing is determined to be abnormal, and information related to the abnormality is output from the output unit 1178 (S312). When the comparison unit 1177 determines that there is an apparatus abnormality and information related to the abnormality is output from the output unit 1178, a device user can stop operation of the device and perform a countermeasure against the apparatus abnormality such as maintenance. As a result, continuous manufacture of a semiconductor in an abnormal state can be prevented, and a cost advantage due to reduction of wafer scrap can be expected.

In an eleventh step (S311), when the comparison unit 1177 determines that there is no abnormality (a case of NO in S311), semiconductor manufacture that uses a next wafer will continue, and operation of the abnormality detection unit 117 returns to the fourth step (S304) of abnormality detection by the data acquisition unit 1171.

In the above-described series of steps, a model for abnormality detection of the plasma processing apparatus 100 is re-created for each wafer processing. In normal abnormality detection, a model is generally created only once after the training data is acquired. However, in the present method, every time new testing data is obtained in S204, a model is re-created in a form that includes information in the testing data (S308 and S309).

As a result, even if an abnormality that cannot be expected at the time of acquiring the training data (S301) occurs at the time of acquiring the testing data (S304), the abnormality detection can be performed by a form that includes an effect of the abnormality in an analysis model.

Since a repetitive model is created in the invention, calculation time used for re-creating a model is required. However, when the number of features is large, a great deal of time is required to create a model with a large number of features. On the other hand, in the invention, by reducing the number of features, time required for one model creation is short. Therefore, in some cases, calculation time may be shorter when the model is re-created for each wafer by using some of the selected features than when the model is created only once by using all the features.

FIGS. 4A to 4D show results when $T^2$ values that indicate the apparatus health index are calculated by each method when continuous processing of 1,400 samples (wafers) is performed.

Figure 4A:
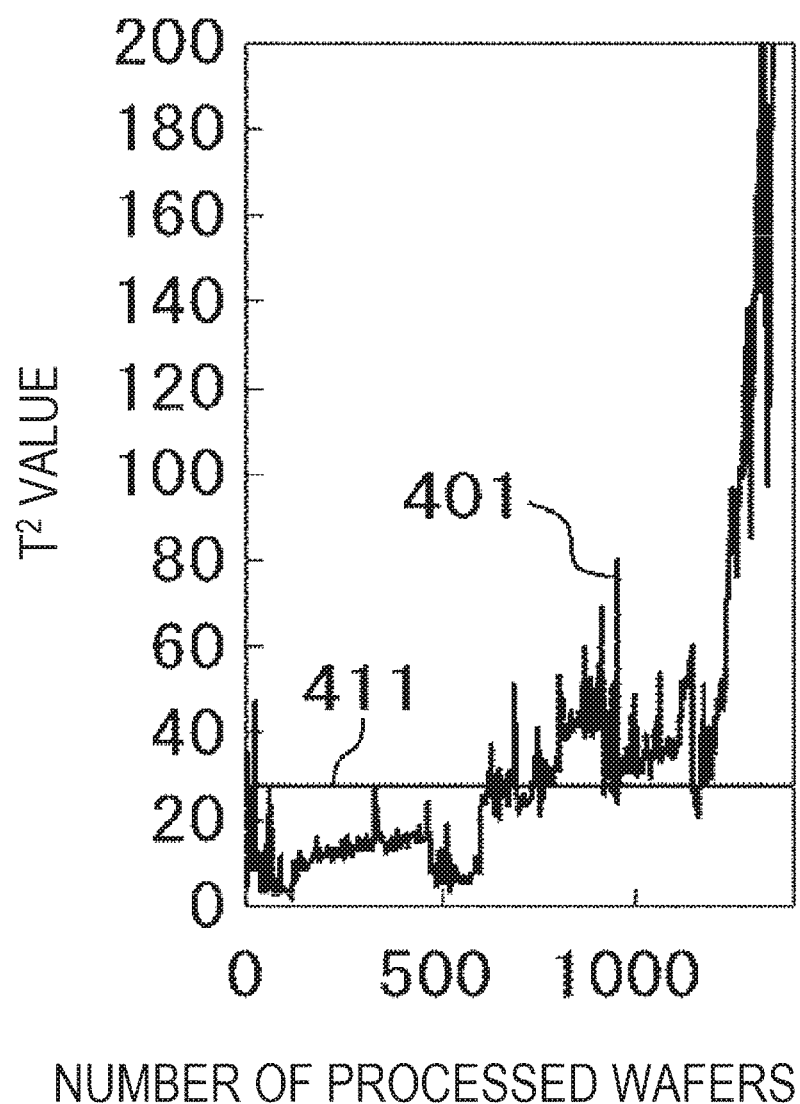
FIG. 4A is a graph showing a comparison example with an abnormality detection method that uses the abnormality detection unit according to the first embodiment of the invention, which shows a relationship between the number of processed wafers and a $T^2$ value when the $T^2$ value is calculated by using all features.

FIG. 4A shows a relationship between the number of processed wafers and a $T^2$ value 401 when abnormality detection is performed by using all the features. In the figure, 411 indicates a threshold value that is a reference for abnormality detection.

In addition, FIG. 4B shows a relationship between the number of processed wafers and a $T^2$ value 402 when abnormality detection is performed by selecting features according to a method described in Non-Patent Literature 1. In the figure, 412 indicates a threshold value that is a reference for abnormality detection.

Further, FIG. 4C shows a relationship between the number of processed wafers and a $T^2$ value 403 when abnormality detection is performed by the abnormality detection unit 117 described in the present embodiment. In the figure, 413 indicates a threshold value being a reference for abnormality detection.

Figure 4D:
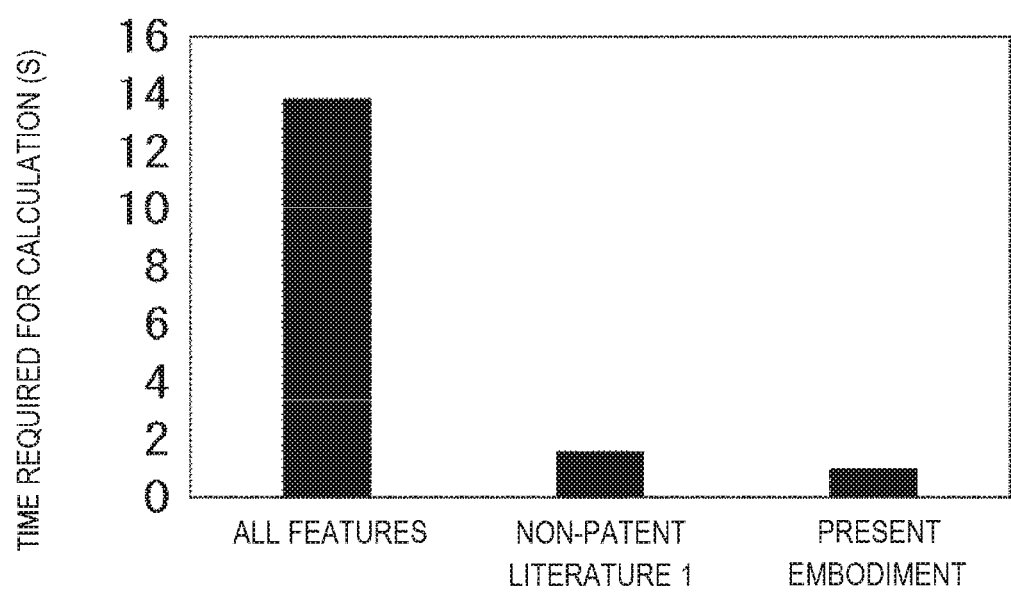
FIG. 4D is a graph comparing time required for calculating the result of abnormality detection that is performed by using the abnormality detection unit according to the first embodiment of the invention and time required for calculating the result of abnormality detection that is performed by using a related method.

In addition, FIG. 4D shows time required to calculate a $T^2$ value that indicates an apparatus health index for each processed wafer with respect to three cases that include a case where abnormality detection is performed by using all the features corresponding to FIG. 4A, a case where abnormality detection is performed by selecting features according to the method described in Non-Patent Literature 1 corresponding to FIG. 4B, and a case where abnormality detection is performed by the abnormality detection unit 117 according to the present embodiment corresponding to FIG. 4C.

As shown in FIG. 4A, when all the features are used, an abnormality which exceeds a threshold value 411 is detected frequently after a 600th sample. Calculation time required for the analysis is relatively long, which is 13.9 s. When a feature is selected according to the method described in Non-Patent Literature 1 shown in FIG. 4B, although calculation time is as short as about 1.60 s, an abnormality which exceeds a threshold value 412 is not detected over all 1,000 samples, and a result is that most abnormalities that can be detected when all the features are used are overlooked.

In contrast, as shown in FIG. 4C, when a feature is selected according to the method described in the present embodiment, an abnormality which exceeds a threshold value 413 is detected after a 100th sample. As shown in FIG. 4D, time required for the calculation is 0.972 s, and abnormality detection can be performed in a very short time as compared with a case of using all the samples.

An abnormality in the plasma processing apparatus 100 that occurs during semiconductor manufacturing can be detected with high sensitivity and short analysis time by using the abnormality detection unit 117 in the present embodiment as described above.

Although the above-described embodiment describes an example in which abnormality detection inside the processing chamber 101 is performed, the present embodiment is not limited thereto, and is also applied to a case where abnormality detection for the transfer chamber 130, the evacuation unit and the gas supply unit (not shown) is performed by receiving output signals from a sensor provided in each unit. That is, according to the invention of the present embodiment, a state of any configuration provided in the plasma processing apparatus is predicted. Here, the "configuration provided in the plasma processing apparatus" refers to, for example, the "processing chamber 101" and the "transfer chamber".

Second Embodiment

In a second embodiment, a method of further reducing a computation load used for calculating an apparatus health index as compared with a case of a first embodiment will be described with reference to a part of a configuration different from the first embodiment.

Since apparatus configurations in the present embodiment are the same as that of the plasma processing apparatus 100 described with reference to FIG. 1 in the first embodiment, except for an abnormality detection unit 217 of the apparatus state abnormality detection unit 220, descriptions other than the abnormality detection unit 217 will be omitted.

FIG. 5 is a block diagram showing a configuration of the abnormality detection unit 217 of an apparatus state abnormality detection unit 220 according to the present embodiment. The abnormality detection unit 217 according to the present embodiment includes a data acquisition unit 2171, a calculation unit 2172, a feature ranking creation unit 2173, a feature selection unit 2174, an apparatus health index calculation unit 2175, an apparatus health index threshold value calculation unit 2176, a re-standardization unit 2177, a comparison unit 2178, and an output unit 2179. Abnormality detection is performed by using information of various features extracted by the feature extraction unit 116, and a result thereof is output to an outside from the output unit 2179.

Figure 6:
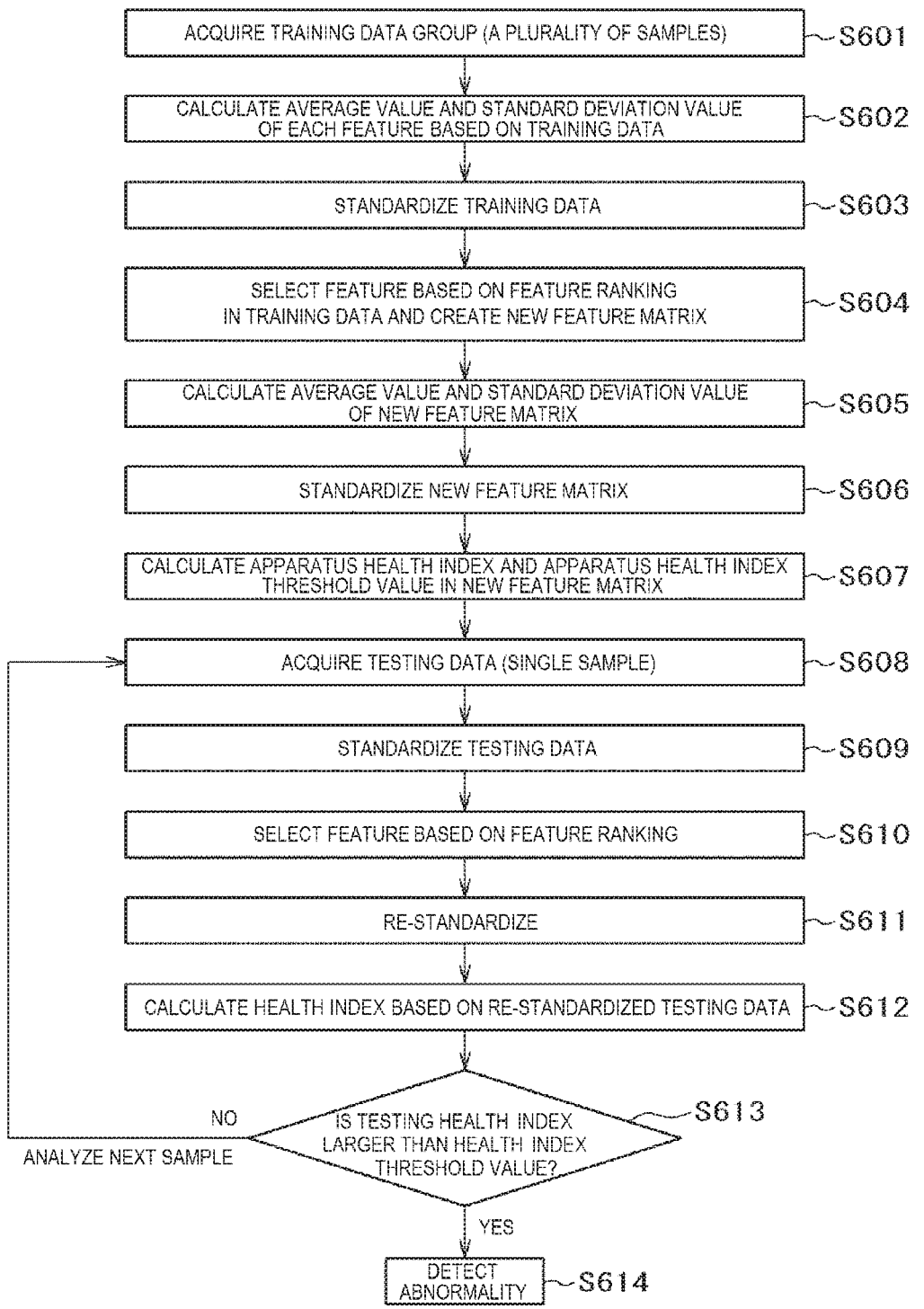
FIG. 6 is a flowchart showing a processing flow in abnormality detection in the plasma processing apparatus according to the second embodiment of the invention.

FIG. 6 is a flowchart of abnormality detection steps performed in the present embodiment by the abnormality detection unit 217 in FIG. 5.

In a first step (S601) of abnormality detection, the data acquisition unit 2171 acquires a data group for a plurality of samples. The data group only includes data extracted by the feature extraction unit 116 in a normal etching apparatus state. A training data group is thus acquired.

In a second step (S602) of abnormality detection, based on the training data acquired by the data acquisition unit 2171 in S601, the calculation unit 2172 calculates an average value and a standard deviation value of all samples of features in the normal apparatus state.

In a third step (S603) of abnormality detection, the calculation unit 2172 subtracts the average value of all the samples of the features in the training data calculated in S602 from a value of each feature of each sample in the training data acquired in S601 (subtraction processing). Further, the calculation unit 2172 divides a value obtained by the subtraction processing by the standard deviation value of all the samples of the features in the training data calculated in S602 to standardize the training data. The standardization processing of the training data is the same as the standardization processing of the training data in S303 described in the first embodiment.

In a fourth step (S604) of abnormality detection, the feature ranking creation unit 2173 creates a ranking of the features in descending order of standardized values in the training data standardized by the calculation unit 2172 in the third step (S603), and the feature selection unit 2174 selects a predetermined number of features of the ranking created by the feature ranking creation unit 2173 in descending order of the rankings. For example, when ten features are selected, features from a first rank to a tenth rank are selected. The selection is performed over all samples.

Here, although a new feature matrix is created by newly selected features (new features), a column vector of the new feature matrix is a vector obtained by mixing values of various features. In the following description, a column vector obtained by mixing the various features is considered as a feature.

In a fifth step (S605) of abnormality detection, the calculation unit 2172 calculates an average value and a standard deviation value of each feature based on the new feature matrix obtained in the fourth step (S604).

In a sixth step (S606) of abnormality detection, the calculation unit 2172 standardizes the new feature matrix created by the feature selection unit 2174 in the fourth step (S604) by using the average value and the standard deviation value obtained by the calculation unit 2172 in the fifth step (S605).

In a seventh step (S607) of abnormality detection, a principal component analysis is performed by using the standardized feature matrix created in the sixth step (S606), an apparatus health index associated therewith is calculated by the apparatus health index calculation unit 2175, and an apparatus health index threshold value is calculated by the apparatus health index threshold value calculation unit 2176. Since a method of calculating the apparatus health index in the apparatus health index calculation unit 2175 is the same as the method described in step S308 according to the first embodiment, a detailed description thereof will be omitted.

In an eighth step (S608) of abnormality detection, the data acquisition unit 2171 acquires testing data from the feature extraction unit 116. The testing data is taken as a single sample.

In a ninth step (S609) of abnormality detection, the calculation unit 2172 standardizes the testing data acquired by the data acquisition unit 2171 in the eighth step (S608) by using the average value and the standard deviation value obtained in the second step (S602).

In a tenth step (S610) of abnormality detection, the feature ranking creation unit 2173 creates a ranking of features in descending order of standardized values in the standardized testing data obtained by the calculation unit 2172 in the ninth step (S609), and the feature selection unit 2174 selects a predetermined number of features of the ranking created by the feature ranking creation unit 2173 in descending order of the ranking.

In an eleventh step (S611) of abnormality detection, the re-standardization unit 2177 re-standardizes each feature rearranged in the tenth step (S610) by using the average value and the standard deviation value obtained in the fifth step (S605).

In a twelfth step (S612) of abnormality detection, the apparatus health index calculation unit 2175 calculates the apparatus health index based on the re-standardized testing data by using the re-standardized feature obtained in the eleventh step (S611) and the principal component model obtained in the seventh step (S607).

In a thirteenth step (S613) of abnormality detection, the comparison unit 2178 compares the apparatus health index in processing for abnormality detection calculated by the apparatus health index calculation unit 2175 in the twelfth step (S612) with the health index threshold value obtained by the apparatus health index calculation unit 2175 in the seventh step (S612). If the apparatus health index calculated in the twelfth step (S612) is larger than the health index threshold value obtained in the seventh step (S707) (a case of YES), the processing is determined to be abnormal, and information related to the abnormality is output from the output unit 1178 (S614).

On the other hand, when the apparatus health index calculated in the twelfth step (S612) is smaller than the health index threshold value obtained in the seventh step (S607) and the processing is not determined to be abnormal (a case of NO), next wafer processing is performed, and the processing returns to the eighth step (S608) of abnormality detection.

In the method according to the second embodiment, even in each sample in the normal apparatus state, data operation is performed in which volume of deviation from the average value of normal data is redefined as a new feature by rearranging the feature according to a ranking of deviation from the average value of the normal data. With such operation, information for each testing data can be incorporated into analysis without repeatedly creating a principal component model, and further calculation load reduction can be realized compared to the case of the first embodiment.

Although the invention is described in detail based on the embodiments, the invention is not limited to the above embodiments, and various modifications can be made without departing from the scope of the invention.

For example, although the principal component analysis and the Hotteling's $T^2$ associated therewith are used to detect an abnormality in the embodiments, other abnormality detection units may be used.

For example, although in the embodiments, a feature extraction unit that extracts a feature from a sensor signal and the abnormality detection unit 217 that performs analysis related to abnormality detection are described independently of a control device of the apparatus, the feature extraction unit and the abnormality detection unit may be incorporated in the control device of the apparatus. In addition, any number of sensors may be used.

The present embodiment can also be applied to a case where abnormality detection for the transfer chamber 130, the vacuum evacuation unit and the gas supply unit (not shown) is performed by receiving output signals from a sensor provided in each unit.

Although the invention is applied to the plasma processing apparatus in the embodiments, the invention is also applicable to a semiconductor manufacturing apparatus such as a vacuum processing apparatus, an exposure apparatus, a film forming apparatus and an annealing apparatus in addition to the plasma processing apparatus.

What is claimed is:

1. A state prediction apparatus that predicts a state of a plasma processing apparatus, comprising:
   a computer configured to
      acquire training data comprising a data group for a plurality of samples, the data group including extracted feature data obtained in a normal etching apparatus state;
      calculate a first set of features that indicates a state of the plasma processing apparatus based on the acquired training data of the plasma processing apparatus when the state of the plasma processing apparatus is a normal state;
      acquire a second set of features comprising testing data for detecting an abnormality;
      standardize the features in the second set using the features in the first set, wherein the standardized features of the second set comprise a value indicating a degree of deviation of the plasma processing apparatus from the normal state in the second set of features;
      create a ranking of the features of the standardized features of the second set;
      select a number in descending order of the ranked features;
      create a model that predicts the state of the plasma processing apparatus using a subset of the first set of features, which is composed of a same kind of features selected in descending order of the standardized features in the second set; and
      predict the state of the plasma processing apparatus by using the generated model.

2. The state prediction apparatus according to claim 1, wherein
   the generated model is regenerated each time the state of the plasma processing apparatus is predicted.

3. The state prediction apparatus according to claim 1, wherein
   the standardized features in the second set are each a value obtained by dividing a value, which is obtained by subtracting an average value of the features in the first set in a plurality of plasma processings from the features in the second set, by a standard deviation of the features in the first set in the plurality of plasma processings.

4. A semiconductor manufacturing apparatus, comprising:
   a processing chamber in which a sample is processed;
   a transfer chamber that transfers the sample to the processing chamber and is connected to the processing chamber; and
   a control device comprising a computer configured to acquire training data comprising a data group for a plurality of samples, the data group including feature data extracted in a normal etching apparatus state;

calculate a first set of features that indicates a state of the plasma processing apparatus based on the acquired training data of the plasma processing apparatus when the state of the plasma processing apparatus is a normal state;

acquire a second set of features comprising testing data for detecting an abnormality;

standardize the features in the second set using the features in the first set, wherein the standardized features of the second set comprise a value indicating a degree of deviation of the plasma processing apparatus from the normal state in the second set of features;

create a ranking of the features of the standardized features of the second set;

select a number in descending order of the ranked features;

create a model that predicts the state of the plasma processing apparatus using a subset of the first set of features, which is composed of a same kind of features selected in descending order of the standardized features in the second set; and predict the state of the plasma processing apparatus by using the generated model.

5. The semiconductor manufacturing apparatus according to claim 4, wherein
any position in the semiconductor manufacturing apparatus is the processing chamber or the transfer chamber.

6. The semiconductor manufacturing apparatus according to claim 5, wherein
the standardized features in the second set are each a value obtained by dividing a value, which is obtained by subtracting an average value of the features in the first set in a plurality of processings from the features in the second set, by a standard deviation of the features in the first set in the plurality of processings.

7. A semiconductor manufacturing apparatus comprising:
a processing chamber in which a sample is processed and a transfer chamber which transfers the sample to the processing chamber and is connected to the processing chamber; and a state prediction apparatus comprising a computer configured to acquire training data comprising a data group for a plurality of samples, the data group including feature data extracted in a normal etching apparatus state;

calculate a first set of features that indicates a state of the plasma processing apparatus based on the acquired training data of the plasma processing apparatus when the state of the plasma processing apparatus is a normal state;

acquire a second set of features comprising testing data for detecting an abnormality;

standardize the features in the second set using the features in the first set, wherein the standardized features of the second set comprise a value indicating a degree of deviation of the plasma processing apparatus from the normal state in the second set of features;

create a ranking of the features of the standardized features of the second set;

select a number in descending order of the ranked features;

create a model that predicts the state of the plasma processing apparatus using a subset of the first set of features, which is composed of a same kind of features selected in descending order of the standardized features in the second set; and predict the state of the plasma processing apparatus by using the generated model.

8. The semiconductor manufacturing apparatus according to claim 7, wherein
any position in the semiconductor manufacturing apparatus is the processing chamber or the transfer chamber.

9. The semiconductor manufacturing apparatus according to claim 8, wherein
the standardized features in the second set are each a value obtained by dividing a value, which is obtained by subtracting an average value of the features in the first set in a plurality of processings from the features in the second set, by a standard deviation of the features in the first set in the plurality of processings.

* * * * *